(12) United States Patent
Armstrong

(10) Patent No.: US 12,486,053 B2
(45) Date of Patent: Dec. 2, 2025

(54) BROAD-BASED ROCKET SHIP

(71) Applicant: Richard Lee Armstrong, West Palm Beach, FL (US)

(72) Inventor: Richard Lee Armstrong, West Palm Beach, FL (US)

( * ) Notice: Subject to any disclaimer, the term of this patent is extended or adjusted under 35 U.S.C. 154(b) by 0 days.

(21) Appl. No.: 17/857,246

(22) Filed: Dec. 6, 2022

(65) Prior Publication Data

US 2024/0182186 A1 Jun. 6, 2024

(51) Int. Cl.
*B64G 1/40* (2006.01)
*B64G 1/64* (2006.01)

(52) U.S. Cl.
CPC ............ *B64G 1/402* (2013.01); *B64G 1/645* (2013.01)

(58) Field of Classification Search
CPC .......... B64G 1/002; B64G 1/008; B64G 1/64; B64G 1/641; B64G 1/643; B64G 5/00; B64G 1/402; B64G 1/645
See application file for complete search history.

(56) References Cited

U.S. PATENT DOCUMENTS

| | | | | |
|---|---|---|---|---|
| 4,132,373 A * | 1/1979 | Lang | ......................... | B64G 1/12 414/427 |
| 5,092,545 A * | 3/1992 | Butterfield | ............... | B64G 1/10 244/158.1 |
| 5,094,409 A * | 3/1992 | King | ........................ | B64G 1/12 244/159.6 |
| 5,813,632 A * | 9/1998 | Taylor | ...................... | B64G 1/12 244/159.6 |
| 6,206,328 B1 * | 3/2001 | Taylor | ...................... | B64G 1/12 244/159.6 |
| 11,565,628 B2 * | 1/2023 | Johnson | .................. | B64G 1/002 |
| 11,718,426 B1 * | 8/2023 | Duschl | ..................... | B64G 5/00 244/171.6 |
| 2009/0302166 A1 * | 12/2009 | Meyers | .................. | B64G 1/402 244/158.9 |
| 2014/0103164 A1 * | 4/2014 | Aston | .................... | B64G 1/402 244/172.3 |
| 2020/0262590 A1 * | 8/2020 | Gentry | ..................... | B64G 1/26 |

* cited by examiner

*Primary Examiner* — Joshua E Rodden

(57) ABSTRACT

A rocket ship consists of several fuel tanks and is surrounded with two levels of rockets, one from the top part for the detachable dome and one from the bottom part of the rocket ship for its main body. This structure of the rocket ship is detachable and will help it to travel longer distance in space. The broad-based rocket ship has its own loading and unloading mechanism with an underground accessway for the infrastructures and other cargo and supplies to be mobilized into the cargo bay. These cargos, supplies and infrastructure will be transported and be used in the rocket ship space travel. Specifically for the infrastructures loaded into the rocket ship, these will be unloaded into the space to serve another function of offering space and work tourism. With the functions mentioned, this does not limit the endless possibilities of broad-based rocket ship.

13 Claims, 10 Drawing Sheets

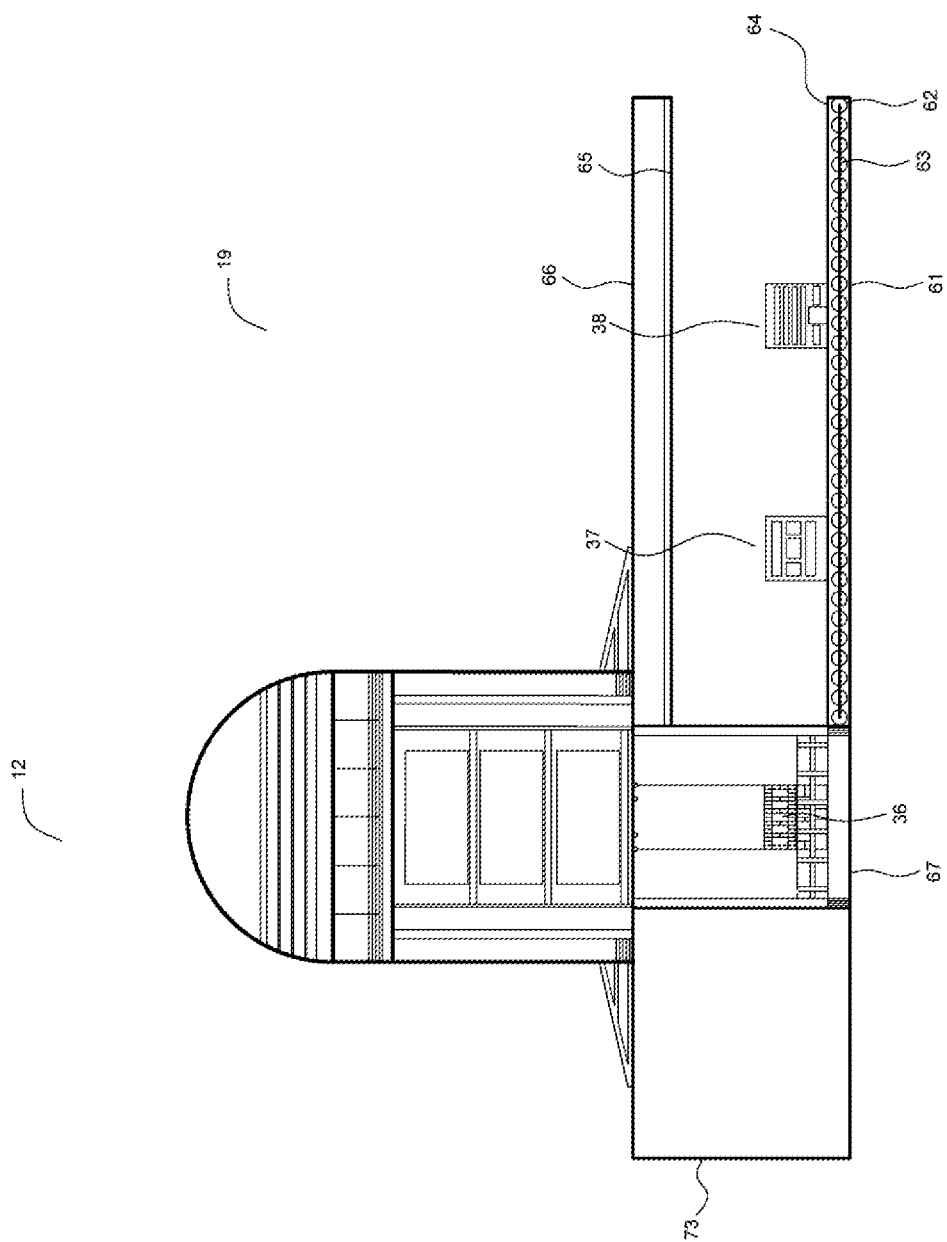

BROAD-BASED ROCKET SHIP

FIELD OF THE INVENTION

The present invention relates generally to a spacecraft. More specifically, the present invention is a broad-based rocket ship.

BACKGROUND OF THE INVENTION

Nowadays, the capacity and the function of rocket ships had been limited to the aspect of weight to be carried and with maximizing a rocket ship can offer in terms of space travel. In terms of transporting cargo and people, the weight and volume of supplies to be carried are limited due to the size of the existing rocket ships. Further, the dimensions and the weight of the supplies are limited thus inhibiting to carrying of different types of cargo and supplies and even infrastructure that is very significant if carried in space specifically office building, restaurant, condos and business establishment. Further, the existing rocket ships are not able to bring up structures that are part of space tourism in space. Therefore, there is a need for improved methods and systems to maximize the size of rocket ships that may overcome one or more of the above-mentioned problems and/or limitations.

SUMMARY OF THE INVENTION

This summary is provided to introduce a selection of concepts in a simplified form, that are further described below in the Detailed Description. This summary is not intended to identify key features or essential features of the claimed subject matter. Nor is this summary intended to be used to limit the claimed subject matter's scope.

According to some embodiments, a broad-based rocket ship is disclosed. Further, the broad-based rocket ship may include a dome, a body of the rocket ship. Further, the broad-base rocket ship may include a bottommost part of the rocket ship, a circular pole attached at the bottommost part of the rocket ship, and a plurality of rockets. Further, the plurality of rockets may include a plurality of dome rockets and a plurality of body rockets. Further, the plurality of dome rockets may be disposed at a bottom of the dome. Further, the plurality of body rockets may be disposed into the body of the rocket ship at bottom of the body of the rocket ship. Further, the broad-based rocket ship may include an outer circular pole. Further, the outer circular pole may be secured at a bottommost part of the broad-based rocket ship (or rocket ship) to support a stable landing of the broad-based rocket ship. Further, a plurality of vertical rods comprised in the broad-based rocket ship may connect an inner circular pole and the outer circular pole to the body of the rocket ship at the bottommost part of the rocket ship. Further, the plurality of levels are inside the main body of the rocket ship. This plurality of levels is where the structures is loaded to be transported in space. Further, the launching mechanism system of the rocket ship is composed of an elevator which loads up the structure inside the rocket ship through a hatch at the bottommost part it. Further, this launching facility in the Earth for the rocket ship is an underground facility in which the cargos and structures loaded into the rocket ship is being carried by a conveyor machine underground and lifter up by the elevator into the rocket ship bottom cargo hatch.

With accordance to the function of the broad-based rocket ship, it carries inside it the levels which are composed of infrastructures to be transported in space such as office buildings, hotels, hospitals, restaurants and business establishment that would be launched in space. It would also be able to carry large sections of space craft that could be assemble in space.

Both the foregoing summary and the following detailed description provide examples and are explanatory only. Accordingly, the foregoing summary and the following detailed description should not be considered to be restrictive. Further, features or variations may be provided in addition to those set forth herein. For example, embodiments may be directed to various feature combinations and sub-combinations described in the detailed description.

BRIEF DESCRIPTION OF THE DRAWINGS

The accompanying drawings, which are incorporated in and constitute a part of this disclosure, illustrate various embodiments of the present disclosure. The drawings contain representations of various trademarks and copyrights owned by the Applicants. In addition, the drawings may contain other marks owned by third parties and are being used for illustrative purposes only. All rights to various trademarks and copyrights represented herein, except those belonging to their respective owners, are vested in and the property of the applicants. The applicants retain and reserve all rights in their trademarks and copyrights included herein, and grant permission to reproduce the material only in connection with reproduction of the granted patent and for no other purpose.

Furthermore, the drawings may contain text or captions that may explain certain embodiments of the present disclosure. This text is included for illustrative, non-limiting, explanatory purposes of certain embodiments detailed in the present disclosure.

FIG. 9 is a front view of the loading and unloading mechanism of the broad-based rocket ship, in accordance with some embodiments.

FIG. 10 is a schematic of a sample flight plan path of the broad-based rocket ship, in accordance with some embodiments.

DETAILED DESCRIPTION OF THE INVENTION

Figure 1:
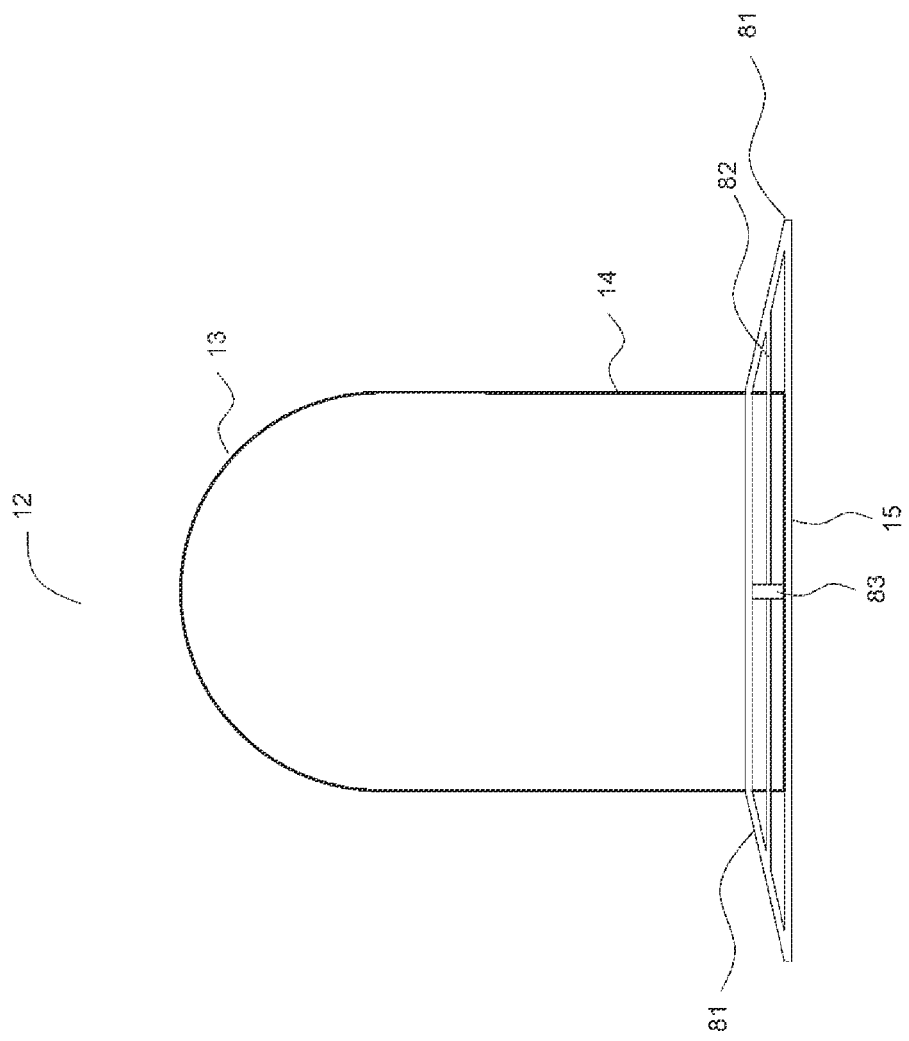
FIG. 1 is a front view of the outer design of the broad-based rocket ship, in accordance with some embodiments.

As a preliminary matter, it will readily be understood by one having ordinary skill in the relevant art that the present disclosure has broad utility and application. As should be understood, any embodiment may incorporate only one or a plurality of the above-disclosed aspects of the disclosure and may further incorporate only one or a plurality of the above-disclosed features. Furthermore, any embodiment discussed and identified as being "preferred" is considered to be part of a best mode contemplated for carrying out the embodiments of the present disclosure. Other embodiments also may be discussed for additional illustrative purposes in providing a full and enabling disclosure. Moreover, many embodiments, such as adaptations, variations, modifications, and equivalent arrangements, will be implicitly disclosed by the embodiments described herein and fall within the scope of the present disclosure.

Accordingly, while embodiments are described herein in detail in relation to one or more embodiments, it is to be understood that this disclosure is illustrative and exemplary of the present disclosure, and are made merely for the purposes of providing a full and enabling disclosure. The detailed disclosure herein of one or more embodiments is not intended, nor is to be construed, to limit the scope of patent protection afforded in any claim of a patent issuing here from, which scope is to be defined by the claims and the equivalents thereof. It is not intended that the scope of patent protection be defined by reading into any claim a limitation found herein that does not explicitly appear in the claim itself.

Thus, for example, any sequence(s) and/or temporal order of steps of various processes or methods that are described herein are illustrative and not restrictive.

Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present invention. Accordingly, it is intended that the scope of patent protection is to be defined by the issued claim(s) rather than the description set forth herein.

Additionally, it is important to note that each term used herein refers to that which an ordinary artisan would understand such term to mean based on the contextual use of such term herein. To the extent that the meaning of a term used herein—as understood by the ordinary artisan based on the contextual use of such term—differs in any way from any particular dictionary definition of such term, it is intended that the meaning of the term as understood by the ordinary artisan should prevail.

Furthermore, it is important to note that, as used herein, "a" and "an" each generally denotes "at least one," but does not exclude a plurality unless the contextual use dictates otherwise. When used herein to join a list of items, "or" denotes "at least one of the items," but does not exclude a plurality of items of the list. Finally, when used herein to join a list of items, "and" denotes "all of the items of the list."

The following detailed description refers to the accompanying drawings. Wherever possible, the same reference numbers are used in the drawings and the following description to refer to the same or similar elements. While many embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims. The present disclosure contains headers. It should be understood that these headers are used as references and are not to be construed as limiting upon the subjected matter disclosed under the header.

The present disclosure includes many aspects and features. Moreover, while many aspects and features relate to, and are described in the context of a broad-based rocket ship, embodiments of the present disclosure are not limited to use only in this context.

Overview

The present disclosure describes a broad-based rocket ship. Further, the broad-based rocket ship may carry levels (or containers) inside its cargo bay. Further, the levels may include different infrastructure buildings carried in the cargo bay inside the broad-based rocket ship. Further, the levels may be unloaded in space to offers a new level of space travel tourism and even with having a new perspective in placing office work buildings, restaurants, condos and business establishment in space. Further, the body of the broad-based rocket ship may be circulated by rockets and fuel tanks that may help the broad-based rocket ship to travel further in space and carry much more load compared to what an existing rocket ship may carry. Further, the broad-based rocket ship may include a unique mechanism upon loading and unloading the levels and other applicable and possible supplies and cargo needed upon its space travel.

Further, the disclosed broad-based rocket ship may be designed to level up and take a step higher on the existing rocket ship. Further, the broad-base rocket ship may be beneficial in the field of transporting people and cargo into space, the way the cargo may be transported and the size and weight of the cargo, that is maximized, and also with the mechanism that helps the broad-based rocket ship to travel further and with great sustainability. The idea of the broad-based rocket ship came from an aspect with regards to the need of maximizing the weight that the broad-based rocket ship may carry in terms of space travel and to be able to sustain greatly on long-distance travel in space. Further, the disclosed broad-based rocket ship may open new opportunities in terms of space tourism that the existing rocket ships may not be able to offer as of now. The disclosed broad-based rocket ship may have endless usage in terms of functionality. Further, the disclosed broad-based rocket ship may change the game on rocket ship function by transporting people and cargo to space and offering a new perspective on space travel and tourism. Further, the broad-based rocket ship may include several fuel tanks and may be surrounded by two levels of rockets, one from the top part for the detachable dome and one from the bottom part of the rocket ship for the main body. Further, the structure of the broad-based rocket ship may help the broad-based rocket ship to travel a longer distance in space and may enable the broad-based rocket ship to be detachable into two parts. Further, the broad-based rocket ship includes a loading and unloading mechanism with an underground accessway for the infrastructures and other cargo and supplies to be mobilized into the cargo bay. Further, the cargos, supplies, and infrastructure may be transported and may be used in the broad-based rocket ship space travel. Further, the infrastructures loaded into the broad-based rocket ship may be unloaded into space to serve another function of offering space tourism. Further, the above functions mentioned may not limit the endless possibilities of the broad-based rocket ship.

Figure 5:
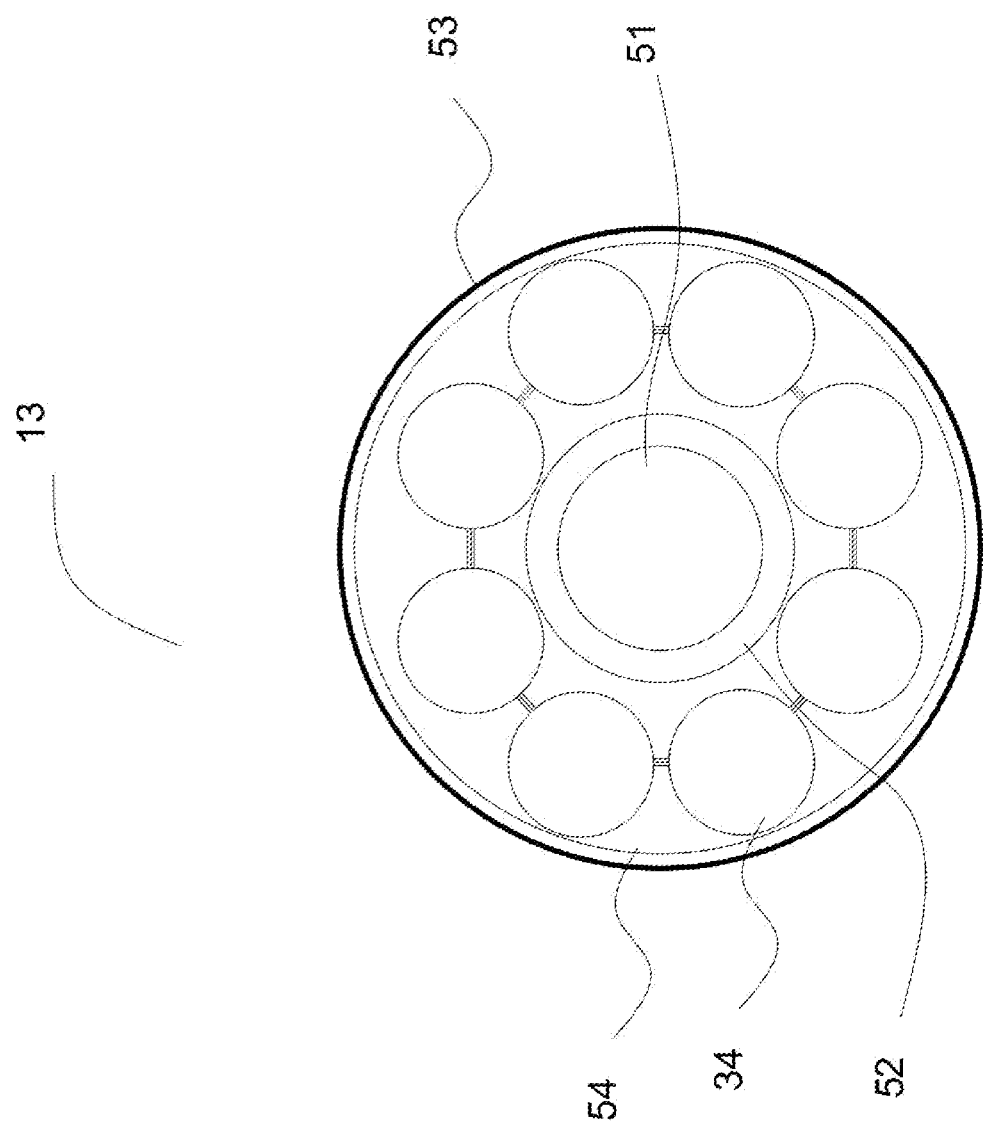
FIG. 5 is a bottom view of the dome of the broad-based rocket ship, in accordance with some embodiments, in accordance with some embodiments.
Figure 7:
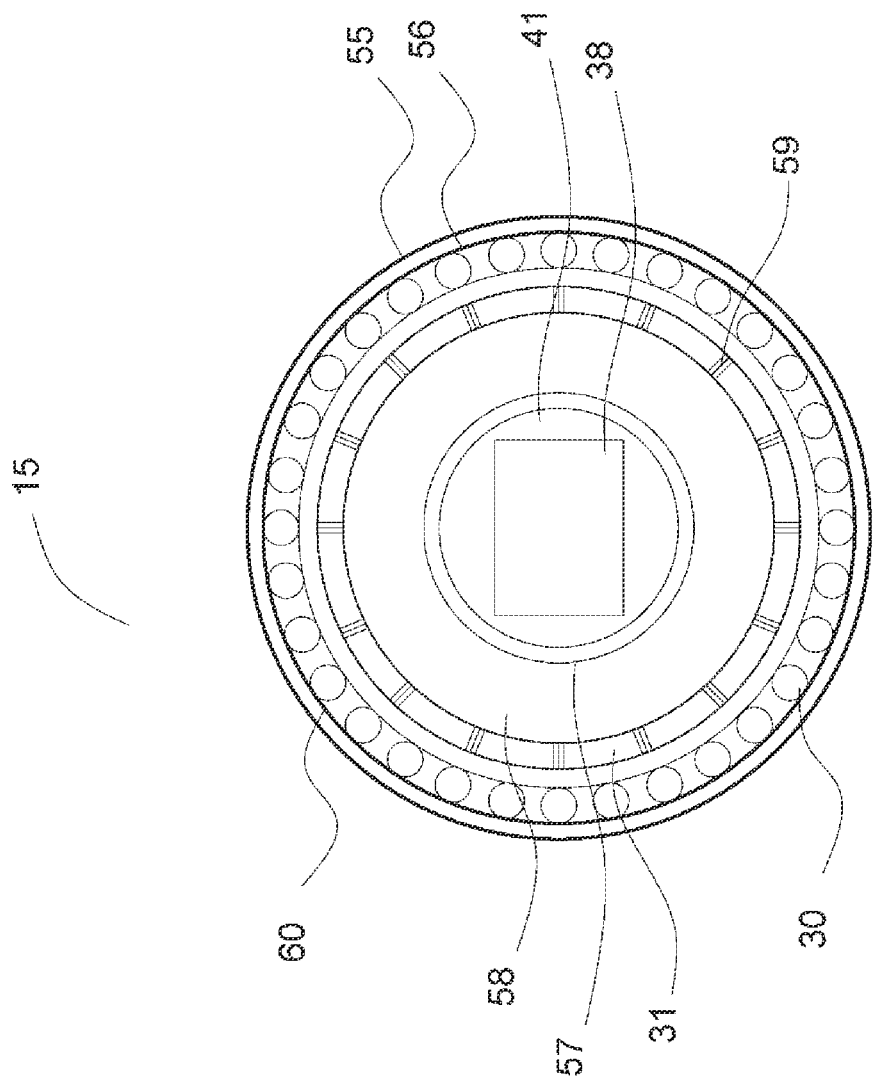
FIG. 7 is a bottom view of the body of the broad-based rocket ship, in accordance with some embodiments.

Referring now to figures, FIG. 1 is a front view of the broad-based rocket ship 12, in accordance with some embodiments. Further, the broad-based rocket ship (or rocket ship) 12 may include a dome 13, a body of the rocket ship 14. Further, the broad-based rocket ship 12 may include a bottommost part 15 of the rocket ship, a circular pole 81 secured at the bottommost part 15 of the rocket ship 12, and a plurality of rockets. Further, the plurality of rockets may include a plurality of dome rockets 34 (as shown in FIG. 5) and a plurality of body rockets 30 (as shown in FIG. 7). Further, the plurality of dome rockets 34 may be disposed into the dome 13 at bottom of the dome 13. Further, the plurality of body rockets 30 may be disposed into the body of the rocket ship 14 at bottom of the body of the rocket ship 14. Further, the broad-based rocket ship 12 may include an outer circular pole 83. Further, the outer circular pole 83 may be secured at a bottommost part 15 of the broad-based rocket ship (or rocket ship) 12 to support a stable landing of the broad-based rocket ship 12. Further, a plurality of vertical rods comprised in the broad-based rocket ship may connect an inner circular pole 82 and the outer circular pole 83 to the body of the rocket ship 14 at the bottommost part of the rocket ship 15.

Figure 2:
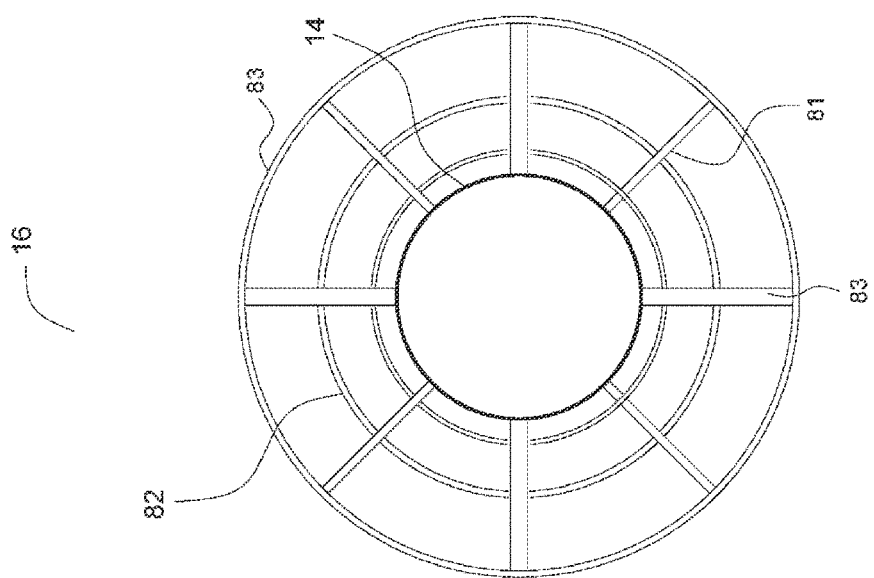
FIG. 2 is a top view of the inner design of the broad-based rocket ship, in accordance with some embodiments.

FIG. 2 is a top view of the broad-based rocket ship 12, in accordance with some embodiments. Further, the lifting mechanism may be configured for lifting the broad-based rocket ship 12 for maneuvering operations. Further, the broad-based rocket ship 12 may include an additional lifting mechanism aside from the plurality of rockets. Further, the additional lifting mechanism may be configured for lifting additional weights and large capacities of a plurality of levels, cargo, supplies, passengers, and a crew on space travel.

Figure 3:
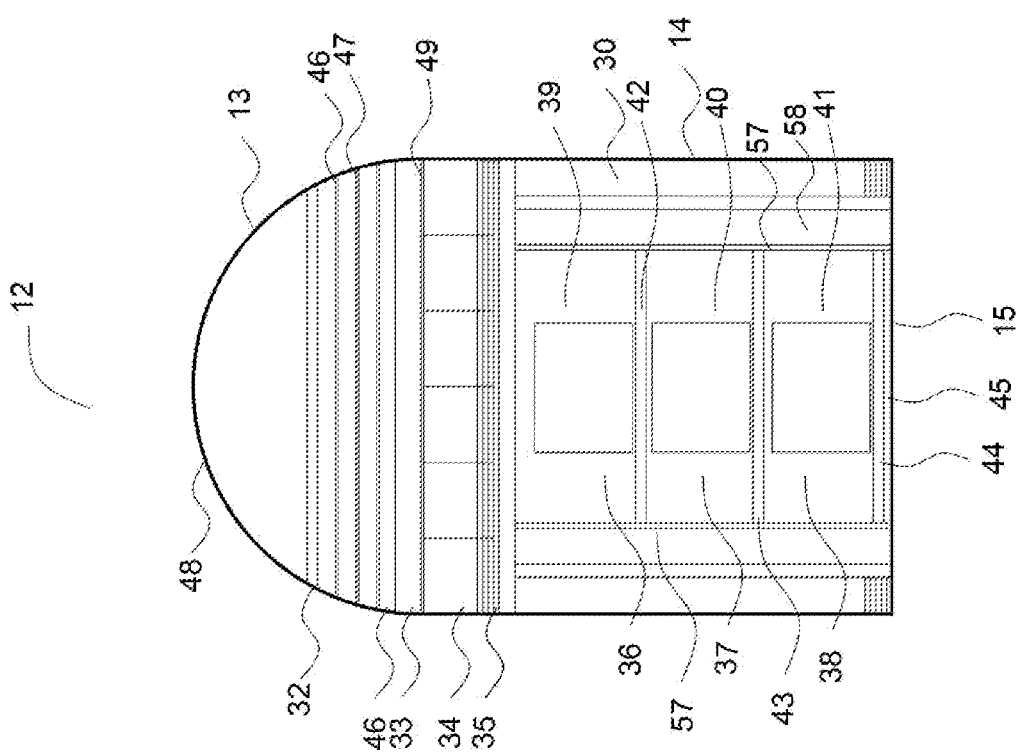
FIG. 3 is a front view of the broad-based rocket ship, in accordance with some embodiments.

FIG. 3 is a front view of the broad-based rocket ship 12, in accordance with some embodiments. Further, the broad-based rocket ship 12 may include two parts. Further, a first part of the two parts may include the dome 13. Further, the dome 13 may be a topmost part of the broad-based rocket ship 12. Further, a second part of the two parts may include the body of the rocket ship 14. Further, the dome 13 may be configured to detach from the body of the rocket ship 14. Further, the dome 13 may include an independent command control system, the plurality of dome rockets 34 (as shown in FIG. 5), fuel, and a mechanism that may help the dome 13 to travel and move through in space even in a detached state. Further, the body of the rocket ship 14 may include an independent command control system, the plurality of body rockets 30 (as shown in FIG. 7), fuel, and a mechanism that may allow the body of the rocket ship 14 to travel and move through in space even in the detached state. Further, the dome 13 may include an independent commanding center 32 that may allow the dome 13 to operate independently even in the detached state. Further, in the detached state, the dome 13 may be detached from the body of the rocket ship 14. Further, a topmost part 48 of the dome 13 may be converted into a transparent dome that may be made of very thick glass to withstand the heavy pressure outside space. Further, the independent commanding center 32 may be located inside the topmost part 48 of the dome 13. Further, the transparent dome may be configured to help a commanding team, scientists, and the crew to be able to see the space environment even from inside. Further, the transparent dome may be configured to give a 360-degree view that makes navigation and studying of the space environment from within the dome 13 easier. Further, the topmost part 48 of the dome 13 may be configured to transform from being transparent to being translucent. Further, below the independent commanding center 32 of the dome 13, the broad-based rocket ship 12 may include the plurality of levels according to the type of accommodation of a passenger. Further, the broad-based rocket ship 12 may include a VIP level accommodation for important personnel. Further, the broad-based rocket ship 12 may include a crew level accommodation 43 for the crew of the broad-based rocket ship 12. Further, the broad-based rocket ship 12 may include a passenger level. Further, in some embodiments, below the passenger levels, a division 46 may separate the passenger levels from a dome fuel storage tank 33. Further, the dome fuel storage tank 33 may be disposed in the interior of the dome 13. Further, a thick wall may separate the dome fuel storage tank 33 from the plurality of dome rockets 34. Further, plurality of dome rockets 34 may be located in the dome 13. Further, the plurality of dome rockets 34 may circulate around the dome 13. Further, the plurality of dome rockets 34 may be arranged side to side and circular at a bottommost part 35 of the dome 13. Further, the body of the rocket ship 14 may be configured to be attached to and detached from the dome 13 at the bottommost part of the dome 35.

Figure 4:
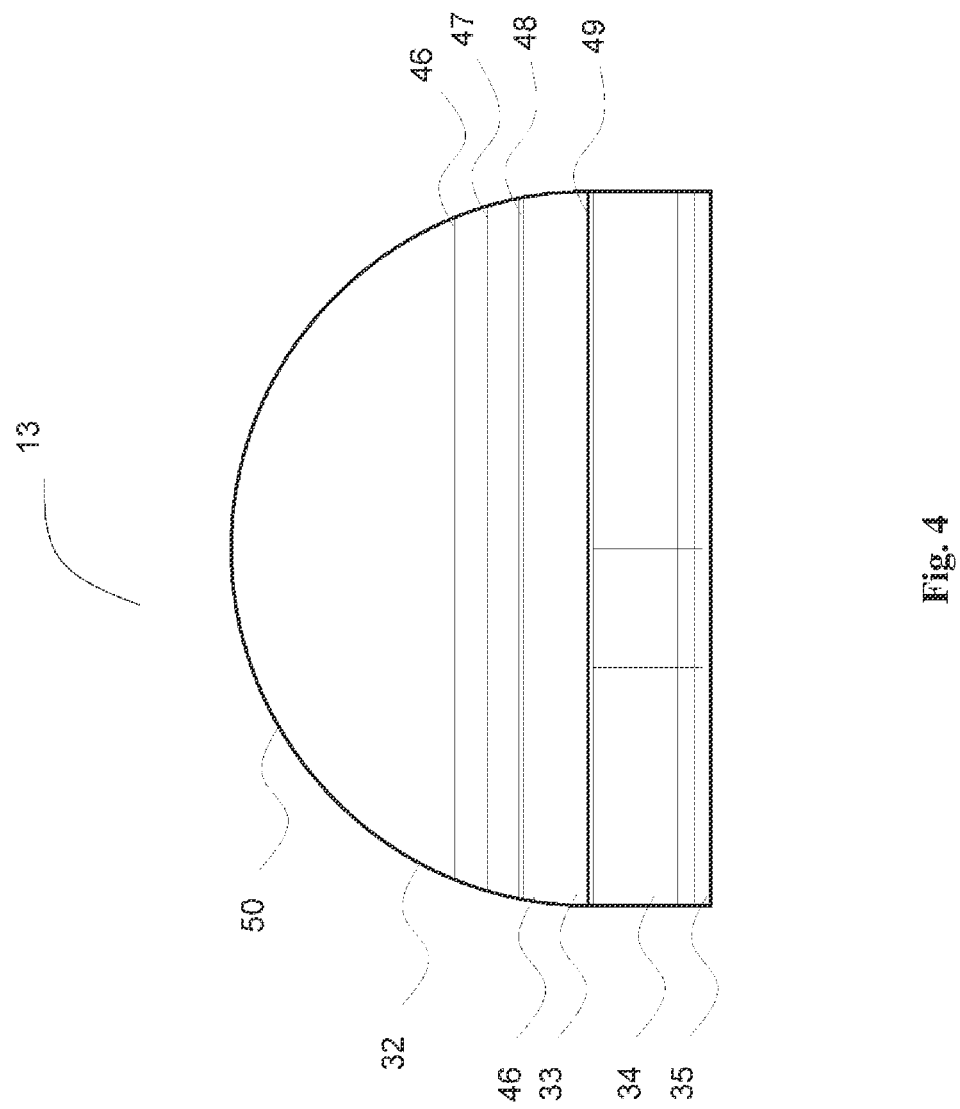
FIG. 4 is a front view of the dome of the broad-based rocket ship, in accordance with some embodiments.

FIG. 4 is a front view of the dome 13 of the broad-based rocket ship 12, in accordance with some embodiments.

FIG. 5 is a bottom view of the dome 13 of the broad-based rocket ship 12, in accordance with some embodiments. Further, the dome 13 may include the plurality of dome rockets 34. Further, the plurality of dome rockets 34 may be arranged circularly around the interior of the dome 13 at the bottommost part 35 of the dome 13. Further, the dome 13 may include a dome outer wall 50 and a dome inner wall 49 to provide safety measures of the dome 13. Further, the dome 13 may include a center accessway 51. Further, the center accessway 51 may be located at center of the dome 13. Further, the center accessway 51 may connect the dome 13 and the body of the rocket ship 14 attached provide accessibility to the body of the rocket ship 14 from the dome 13 and vice versa for the crew and essential personnel. Further, in the attached state, the dome 13 may be attached with the body of the rocket ship 14. Further, in the attached state the crew and essential personnel may access the main body of the rocket ship 14 from the dome 13 and vice versa. Further, a second layer of wall 52 may be located between the center accessway 51 and the plurality of dome rockets 34. Further, the second layer of wall 52 may be configured for separating and protecting the center accessway 51 from the plurality of dome rockets 34 circulating the dome 13.

Figure 6:
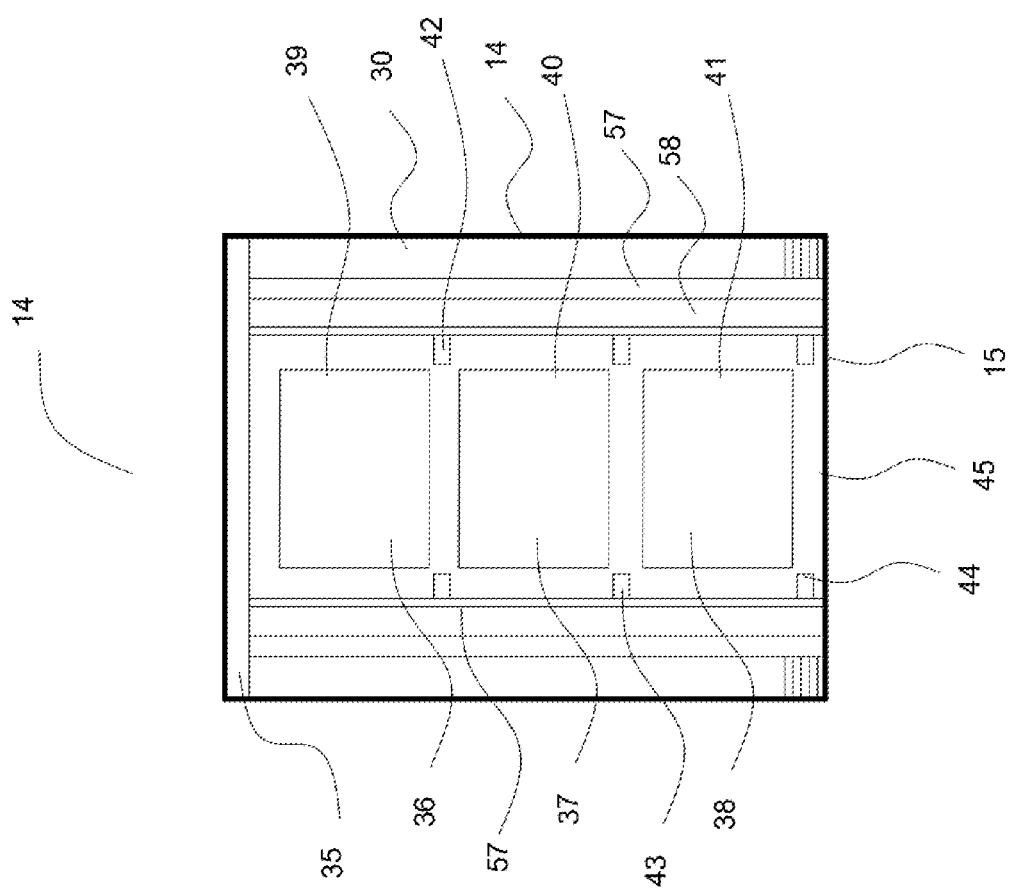
FIG. 6 is a front view of the body of the broad-based rocket ship, in accordance with some embodiments.

FIG. 6 is a front view of the body of the rocket ship 14, in accordance with some embodiments. Further, the body of the rocket ship 14 may include a cargo bay 39. Further, the cargo bay 39 may include a plurality of tiers. Further, in some embodiments, the plurality of tiers may include three tiers. Further, the three tiers may include a top tier 42, middle tier, 43, and a bottom tier 44 (as shown in FIG. 6). Further, the plurality of tiers may be configured to accommodate cargos, supplies, and the plurality of levels. Further, in some embodiments, the plurality of levels may include three levels 36, 37, and 38 (as shown in FIG. 6). Further, the body of the rocket ship 14 may include a body fuel storage tank 58. Further, the body fuel storage tank 58 may be disposed in the interior of the body of the rocket ship 14. Further, a thick wall 31 may be located between the body fuel storage tank 58 and the plurality of body rockets 30. Further, the thick wall 31 may be configured for separating the body fuel storage tank 58 and the plurality of body rockets 30. Further, at the bottom of the broad-based rocket ship 12, the rocket ship 12 may include a cargo bay hatch 45. Further, the cargo bay hatch 45 may provide a passage to the plurality of levels, cargo, and supplies for loading and unloading into and from the cargo bay 39. Further, the cargo bay hatch 45 may open up for the plurality of levels to be loaded into the cargo bay 39 and unload the plurality of levels in space. Further, the cargo bay 39 may include a cargo bay wall. Further, a tier of the plurality of tiers may include a separate opening and accessway for the plurality of levels to be able to be placed on the top tier 42, and into the middle tier 43. Further, the plurality of tiers may include floor divisions. Further, the floor divisions may include an accessway to open for the plurality of levels to be loaded into the tier of the plurality of tiers. Further, the floor divisions may close to serve as floors of the plurality of tiers.

FIG. 7 is a bottom view of the body of the rocket ship 14, in accordance with some embodiments. Further, the body of the rocket ship 14 may include the plurality of body rockets 30. Further, the plurality of the body rockets 30 may be disposed around the body of the rocket ship 14. Further, the body of the rocket ship 14 may include a body outer wall 55 and a body inner wall 56 to serve as an additional safety structure. Further, the body inner wall 56 may be placed adjacent to the plurality of body rockets 30. Further, in some embodiments, the plurality of body rockets 30 may include several body rockets that may fit a diameter of the body of the rocket ship 14 arranged side to side circulating the body of the rocket ship 14. Further, a cofferdam 31 comprised in the rocket ship may separate the plurality of body rockets 30 from the body fuel storage tank 58 to prevent any complications if a body rocket of the plurality of the body rockets 30 and the body fuel storage tank 58 experience any problem during travel. Further, the body fuel storage tank 58 may be configured to store and supply fuel for the body of the rocket ship 14. Further, the cofferdam 31 may include an insulating structure to prevent heat transfer from the plurality of body rockets 30 to the body fuel storage tank 58. Further, the cofferdam 31 may include connecting rods 59 to connect the plurality of body rockets 30 to the body fuel storage tank 58 for additional support structure inside the body of the rocket ship 14. Further, an additional wall 57 outside the cargo bay 39 may separate and protect the cargo bay 39 from the body fuel storage tank 58.

Figure 8:
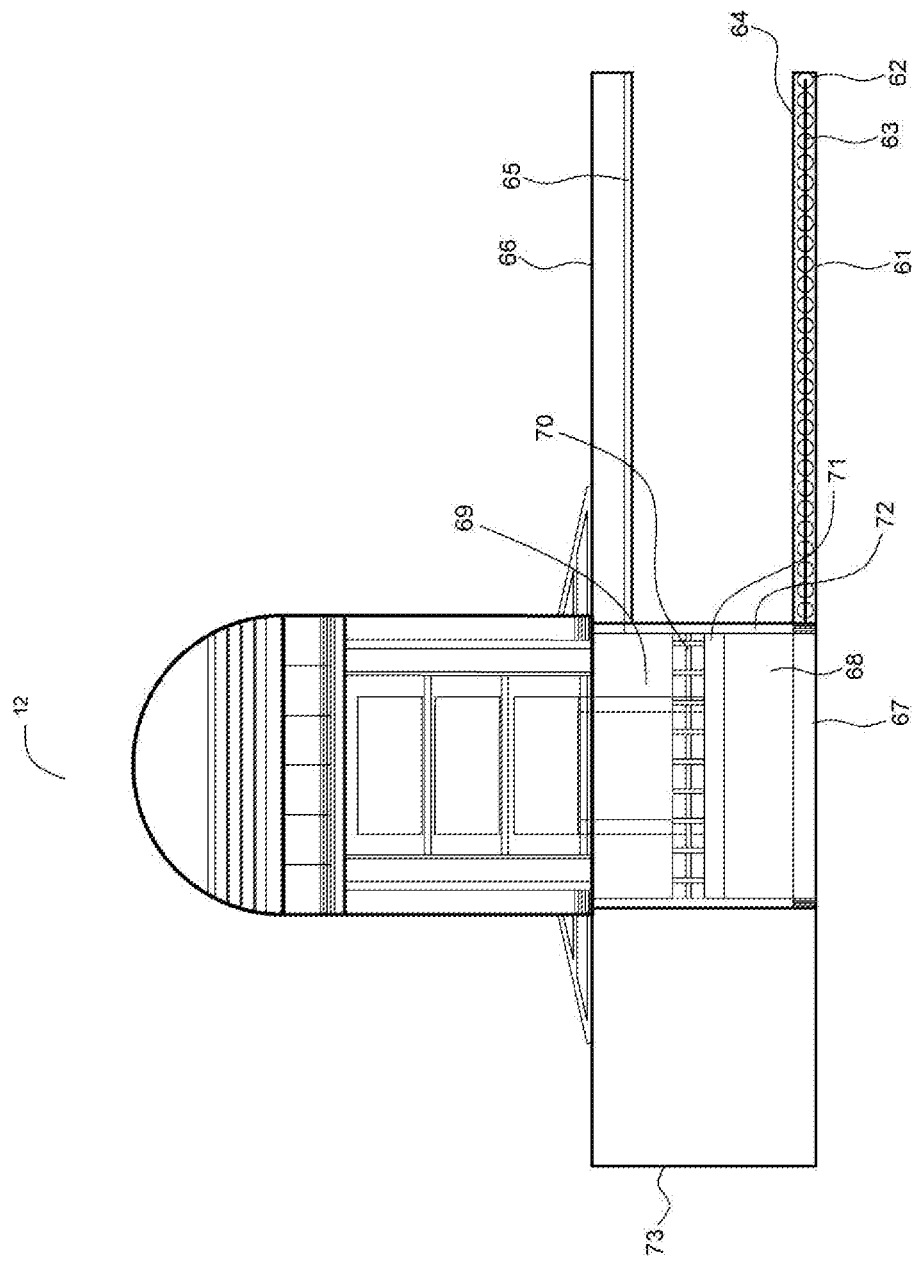
FIG. 8 is a front view of the loading and unloading mechanism and facility of the broad-based rocket ship before the launching stage of the broad-based rocket ship, in accordance with some embodiments.

FIG. 8 is a front view of the loading and unloading mechanism and facility 19 of the broad-based rocket ship 12 before the launching stage of the broad-based rocket ship 12. Further, the loading and unloading mechanism and facility 19 may be located underground. Further, the broad-based rocket ship 12 may be positioned on a designated ground level 66. Further, an underground accessway 65 may be located under the designated ground level 66. Further, the underground accessway 65 may be configured to facilitate the plurality of levels to be mobilized and loaded up the broad-based rocket ship 12. Further, a conveyor-like mechanism 64 may be configured to put the plurality of levels inside the broad-based rocket ship 12. Further, the conveyor-like mechanism 64 may include a plurality of wheels 63, a belt 62, and a platform 61. Further, the belt 62 may be configured to interconnect wheels of the plurality of wheels 63. Further, the platform 61 may be configured to support the plurality of wheels 63 and the belt 62. Further, the loading mechanism facility may include an elevator lift 71. Further, the elevator lift 71 may include an elevator lift entrance 72, at least one cable 69, and railings. Further, an allocated space 68 may be allocated to the elevator lift 71. Further, the loading mechanism may include an elevator platform 67. Further, the elevator lift 71 may be positioned on the elevator platform 61 during the approaching of the plurality of levels near the elevator lift entrance 72. Further, the elevator lift entrance 72 may open and position the plurality of levels inside the elevator lift 71. Further, the elevator lift 71 may be surrounded by the railings 70 to ensure the safety of the plurality of levels once lifted up. Further, the elevator lift 71 may be lifted up on the allocated space 68 by the use of the at least one cable 69 capable enough to lift up the elevator lift 71 up into the cargo bay hatch 45. Further, the plurality of levels may be again cabled up inside the cargo bay hatch 45. Further, the elevator lift 71 may come back to the elevator platform 67 once a first level of the plurality of levels may be positioned inside a designated tier of the plurality of tiers inside the cargo bay 39. Further, a second level of the plurality of levels to be loaded up may be prepared to be lifted up. Further, in some embodiments, the underground accessway 65 may be extended to opposite side 73 to ensure the stability and support the weight of the broad-based rocket ship 12. Further, in some embodiments, the plurality of levels may include three levels 36, 37, and 38 (as shown in FIG. 6). Further, in some embodiments, the plurality of tiers may include three tiers 42, 43, and 44 (as shown in FIG. 6).

FIG. 9 is a front view of a loading and unloading mechanism of the broad-based rocket ship 12, in accordance with some embodiments. FIG. 10 is a schematic of a sample flight plan path of the broad-based rocket ship, in accordance with some embodiments. Further, the sample flight plan path 80 may include a broad-based travel track followed by the rocket ship 12 prior to launching from the Earth, onto the Earth's space, and back to Earth. Further, the broad-based rocket ship 12 may prepare for a flight to space after completion of loading. Further, the sample flight plan path 80 for the broad-based rocket ship 12 may be a simple representation of an actual flight path of the broad-based rocket ship 12. Further, the sample flight plan path 80 may include several positions of the broad-based rocket ship 12. Further, the broad-based rocket ship 12 may be on an initial position 74 before launching. Further, the broad-based rocket ship 12 may be lifted up to a position 75 after the commencement of the launching. Further, the broad-based rocket ship 12 may escape the atmosphere of the earth that may be depicted at a position 76. Further, the broad-based rocket ship 12 may enter the Earth's space that may be depicted by position 77 after successfully escaping the atmosphere. Further, a position 78 may depict the unloading of the broad-based rocket ship 12 with the plurality of levels at Earth's space. Further, on the completion of the unloading, the broad-based rocket ship 12 may prepare for a flight back to Earth and enter again into the atmosphere of the earth may be depicted by a position 79. Further, the sample flight plan path 80 of the broad-based rocket ship 12 may be considered for the broad-based rocket ship 12 only intending to carry the plurality of levels and unload at the Earth's space. Further, the sample flight plan path 80 may include other space travels and explorations.

Although the invention has been explained in relation to its preferred embodiment, it is to be understood that many other possible modifications and variations can be made without departing from the spirit and scope of the invention.

The invention claimed is:

1. A broad-based rocket ship comprises; a detachable dome, a main body detachably connected to the dome, a centrally located three-story cargo bay within the main body, a cargo hatch at a bottom of the main body for loading and unloading Levels, a circular fuel tank positioned outside walls of the cargo bay within the main body, a group of interconnected rockets arranged side-by-side surrounding the fuel tank within the main body, and a landing support structure attached to an underside of the main body.

2. A broad-based rocket ship comprises: a dome, a main body connected to a bottom part of the dome and is detachable from the dome, a three-story cargo bay located centrally inside the main body, a cargo hatch or opening at a bottommost part of the main body where the Levels passes through upon loading in Earth from an underground loading facility and unloading in space, a circular fuel tank located outside walls of the cargo bay in the main body, a group of rockets interconnected side to side circulating outside walls of the fuel tank in the main body, and landing support structure attached at an external bottom part of the main body.

3. The broad-based rocket ship of claim 2, wherein the three-story cargo bay of the main body functions as cargo holds for accommodating the Levels to be loaded therein.

4. The broad-based rocket ship of claim 3, wherein the three-story cargo bay comprises a top story, a middle story, and a bottom story, and the cargo bay is configured to accommodate one of the Levels in each respective story.

5. The broad-based rocket ship of claim 4, wherein each of the story of the three-story cargo bay includes a cargo opening in a respective floor wall to facilitate passage of the Levels during loading and unloading.

6. The broad-based rocket ship of claim 1, is adapted to transport the levels which are prefabricated modules configured as building infrastructures including at least one of offices, hotels, restaurants, and hospitals.

7. The broad-based rocket ship of claim 1, wherein the dome comprises an outer wall adapted to withstand extreme atmospheric pressure during launch and re-entry.

8. The broad-based rocket ship as claimed in claim 3, wherein the dome of the rocket ship consists of rockets, fuel tank, and accommodation for crew, wherein when the dome is detached from the main body the dome will be able to operate and maneuver independently from the main body.

9. The broad-based rocket ship as claimed in claim 2, wherein the main body of the rocket ship is detachable from the dome and converted to a stationary base station in space.

10. The broad-based rocket ship as claimed in claim 2, wherein the landing support structure is for landing safely and securely in uneven terrain.

11. The broad-based rocket ship of claim 2 wherein the walls of the cargo bay comprise a thick wall separating the three-story cargo bay from the circular fuel tank positioned outside the walls of the cargo bay within the main body.

12. The broad-based rocket ship of claim 2 wherein the walls of the fuel tank comprise a thick wall separating the circular fuel tank positioned outside the walls of the cargo bay within the main body from the group of interconnected rockets arranged side-by-side surrounding the fuel tank within the main body.

13. The broad-based rocket ship of claim 1 is adapted to be loaded with the Levels from a separate loading facility system.

* * * * *